US012617349B2

(12) United States Patent (10) Patent No.: US 12,617,349 B2
Casagrande et al. (45) Date of Patent: *May 5, 2026

(54) TRANSPORT RACK ASSEMBLY

(71) Applicant: Seasucker, LLC, Bradenton, FL (US)

(72) Inventors: Charles L. Casagrande, Bradenton, FL
(US); Milton L. Pinto, Sarasota, FL
(US); Genevieve Valk, Bradenton, FL
(US)

(73) Assignee: Seasucker, LLC, Bradenton, FL (US)

( * ) Notice: Subject to any disclaimer, the term of this
patent is extended or adjusted under 35
U.S.C. 154(b) by 81 days.

This patent is subject to a terminal dis-
claimer.

(21) Appl. No.: 18/537,343

(22) Filed: Dec. 12, 2023

(65) Prior Publication Data

US 2025/0187548 A1 Jun. 12, 2025

(51) Int. Cl.
B60R 9/10 (2006.01)
F16B 2/10 (2006.01)

(52) U.S. Cl.
CPC . B60R 9/10 (2013.01); F16B 2/10 (2013.01)

(58) Field of Classification Search
CPC ... F16B 2/10; F16B 47/00; B60R 9/10; B60R
9/058; B60R 9/048
See application file for complete search history.

(56) References Cited

U.S. PATENT DOCUMENTS

| | | | | |
|---|---|---|---|---|
| 10,765,185 | B1 * | 9/2020 | Wengerd | F16B 2/185 |
| 2012/0159768 | A1 * | 6/2012 | Johnson | F16B 2/10 |
| | | | | 403/187 |

| | | | | |
|---|---|---|---|---|
| 2012/0168481 | A1 * | 7/2012 | Casagrande | B60R 11/00 |
| | | | | 224/559 |
| 2014/0076949 | A1 * | 3/2014 | Casagrande | B60R 9/08 |
| | | | | 224/559 |
| 2015/0041605 | A1 * | 2/2015 | Nam | F16M 11/10 |
| | | | | 248/316.5 |
| 2015/0322982 | A1 * | 11/2015 | Whittingham | F16B 2/10 |
| | | | | 24/517 |
| 2016/0025264 | A1 * | 1/2016 | Casagrande | F16M 13/00 |
| | | | | 248/205.9 |
| 2018/0229665 | A1 * | 8/2018 | Schactman | F16B 2/185 |
| 2018/0251076 | A1 * | 9/2018 | Casagrande | B62H 3/00 |
| 2019/0086007 | A1 * | 3/2019 | Ahrens | F16B 2/14 |
| 2019/0111395 | A1 * | 4/2019 | Greenizen | G01N 1/4077 |
| 2019/0193249 | A1 * | 6/2019 | Burnett | B25B 5/12 |
| 2020/0155890 | A1 * | 5/2020 | Casagrande | A63B 21/0557 |

(Continued)

*Primary Examiner* — Brian D Nash
(74) *Attorney, Agent, or Firm* — Sandberg Phoenix & von
Gontard, P.C.

(57) ABSTRACT

A transport rack assembly includes a left side clamp base
and a separate right side clamp base that are adjustably
positionable toward and away from each other. Both the left
side clamp base and right side clamp base have a first clamp
and a second clamp. The second clamp on each clamp base
is movable toward and away from the first clamp on each
clamp base between a first position where the first clamp and
second clamp are spaced from each other enabling an object
to be positioned between the first clamp and the second
clamp, and a second position where the first clamp and
second clamp engage with each other enabling the object to
be clamped between the first clamp and second clamp. The
transport rack assembly also includes a strap base that is
separate from the left side clamp base and the right side
clamp base.

20 Claims, 7 Drawing Sheets

(56)          References Cited

U.S. PATENT DOCUMENTS

| | | | |
|---|---|---|---|
| 2020/0198546 A1* | 6/2020 | Casagrande | F16B 7/0413 |
| 2022/0258676 A1* | 8/2022 | Casagrande | B60R 9/055 |
| 2022/0340087 A1* | 10/2022 | Casagrande | B60R 9/048 |
| 2023/0098547 A1* | 3/2023 | Kargenian | B25B 25/00 |
| | | | 294/192 |
| 2025/0109822 A1* | 4/2025 | Pinto | F16M 13/02 |

* cited by examiner

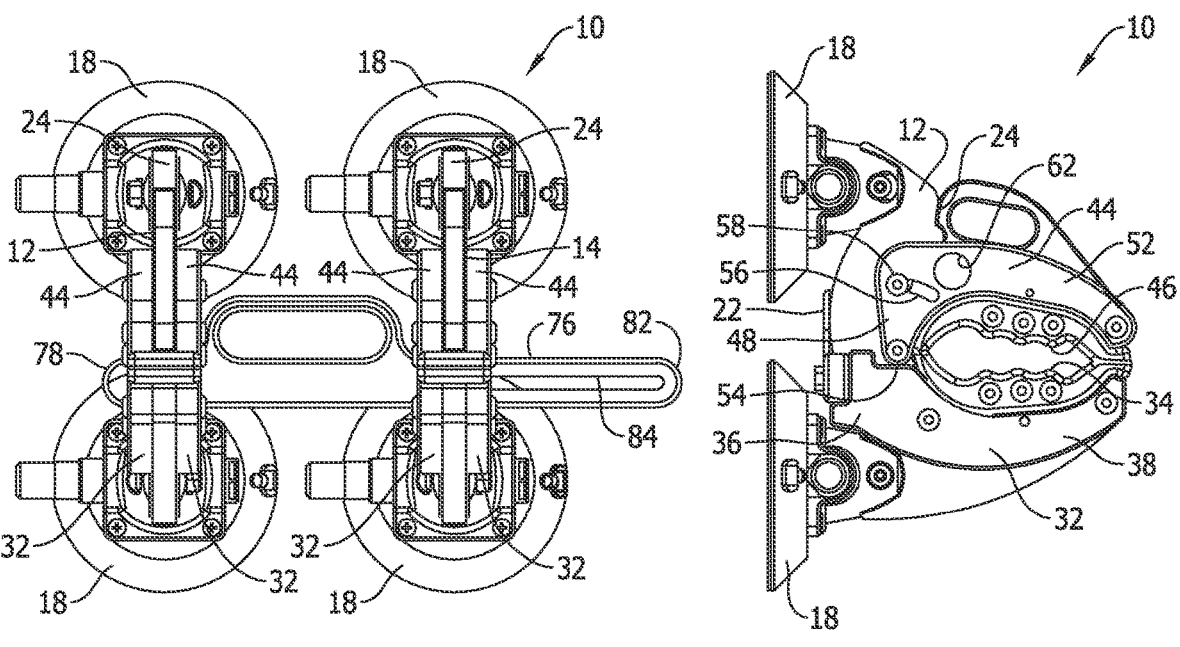
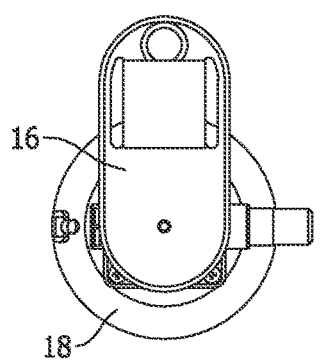
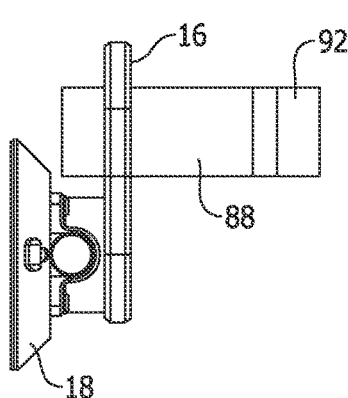
FIG. 2          FIG. 3

TRANSPORT RACK ASSEMBLY

BACKGROUND OF THE INVENTION

This disclosure pertains to the construction and the functioning of a transport rack assembly comprised of several separate component parts that are each releasably attachable to a separate surface, for example a surface of a vehicle. Each of the component parts is configured to be easily and quickly operable to grip or attach to a separate object and thereby removably attach the separate object to the transport rack assembly that has been previously attached to a vehicle. For example, each of the component parts is configured to be removably attached to a part of a bicycle and thereby easily and quickly attach the bicycle to the vehicle using the transport rack assembly.

SUMMARY OF THE INVENTION

The transport rack assembly is comprised of three separate basic components, a first clamp base, a second clamp base and a third strap base. Each of the components is constructed with removable attachment devices that are configured to enable the components to be removably attached to a separate surface, for example a surface of a vehicle.

The first clamp base and the second clamp base are substantially mirror images of each other and have substantially the same constructions.

Each clamp base has a configuration of an upright oriented panel that supports a clamp assembly. The clamp assembly comprises a first clamp projecting from the clamp base. The first clamp as a length that extends in a horizontal orientation from a proximal end of the first clamp which is secured stationary to the clamp base, to a distal end of the first clamp.

The clamp assembly also comprises a second clamp projecting from the clamp base. The second clamp has a length that extends in a horizontal orientation from a proximal end of the second clamp which is connected to the clamp base, to a distal end of the second clamp.

A movable connection connects the proximal end of the second clamp to the clamp base. The movable connection is configured to enable the second clamp to move in pivoting movements on the clamp base toward and away from the first clamp. The second clamp is movable between a clamping position where a first clamping surface of the first clamp engages with a second clamping surface of the second clamp, and an open position where the first clamping surface of the first clamp is spaced from the second clamping surface of the second clamp. The spacing enables a separate object, for example a part of a bicycle to be positioned between the first clamping surface and the second clamping surface. The movable connection comprises a pivot pin connecting the proximal end of the second clamp to the clamp base for pivoting movements of the second clamp about the pivot pin. The movable connection also comprises a slot in a portion of the proximal end of the second clamp. The movable connection further comprises a guide pin secured to the clamp base and extending into the slot in the second clamp. The guide pin extends into and is movable in the slot in response to the second clamp being moved in pivoting movements about the pivot pin. The pivot pin, the slot in the portion of the proximal end of the second clamp and the guide pin provide the movable connection that enables the second clamping surface on the second clamp to move toward and away from the first clamping surface on the first clamp.

There is a first opening on the second clamp. The first opening is positioned adjacent the proximal end of the second clamp. The first opening is positioned on the second clamp to align with a distal edge of the clamp base when the second clamp is moved to the clamping position of the second clamp. The alignment of the first opening and the distal edge of the clamp base enables an object, for example a lock shackle or cable to be inserted into the first opening and adjacent the distal edge of the clamp base preventing pivoting movement of the second clamp toward the distal edge of the clamp base and securing together the first clamping surface and the second clamping surface.

A lever is mounted on the second clamp. The lever is mounted by a pivot pin on the distal end of the second clamp. There is a second opening on the lever. The lever is movable about the pivot pin on the second clamp between a first position of the lever on the second clamp where the second opening on the lever is spaced from the first opening on the second clamp, and a second position of the lever on the second clamp where the second opening on the lever is in alignment with the first opening on the second clamp. In the second position of the lever an engagement surface of the lever opposes and engages against the distal edge of the clamp base. This engagement of the engagement surface of the lever against the distal edge of the clamp base prevents the pivoting movement of the second clamp toward the distal edge of the clamp base and secures together the first clamping surface and the second clamping surface.

A connection device connects the first clamp base and the second clamp base in horizontally spaced relative positions. The connection device is adjustable enabling the first clamp base and the second clamp base to be moved toward each other to a first spacing between the first clamp base and the second clamp base on the connection device and enabling the first clamp base and the second clamp base to be moved away from each other to a second spacing between the first clamp base and the second clamp base on the connection device. The second spacing is different from or larger than the first spacing.

The third strap base has a different construction from the first clamp base and the second clamp base. A strap extends from the third strap base. The strap is configured to engage with and around a separate object positioned adjacent the third strap base to secure the object to the third strap base. The strap has a first portion and a second portion that are removably attachable together. The first portion and second portion of the strap are dimensioned to extend around and secure the separate object to the third strap base.

BRIEF DESCRIPTION OF DRAWINGS

Further objects and features of the transport rack assembly of this disclosure are set forth in the following detailed description of the transport rack assembly and the drawing figures.

FIG. 2 is a representation of a front elevation view of the transport rack assembly.

FIG. 3 is a representation of a left side elevation view of the transport rack assembly, with the right side elevation view of the transport rack assembly being a mirror image thereof.

DETAILED DESCRIPTION OF THE INVENTION

Figure 1:
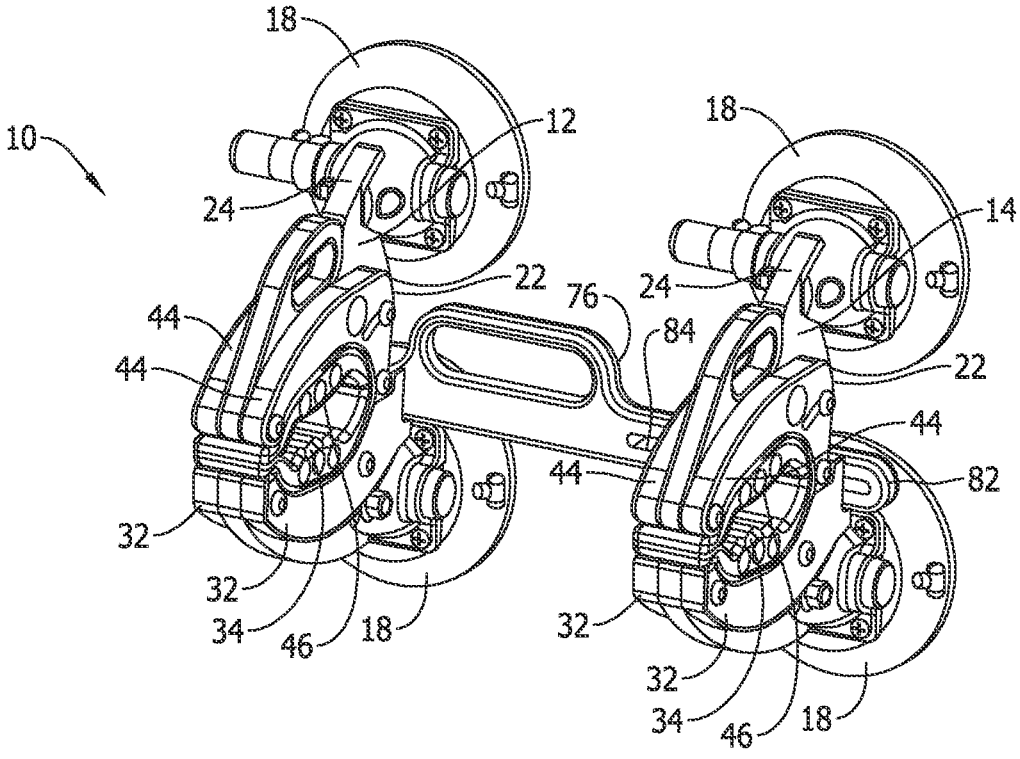
FIG. 1 is a representation of a perspective view of the transport rack assembly of this disclosure.
Figure 1:
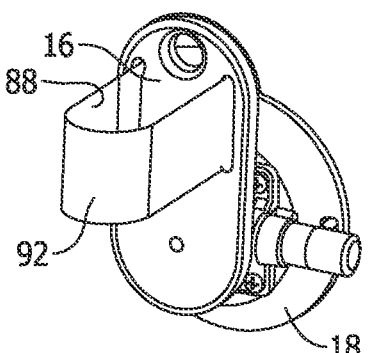
Figure 4:
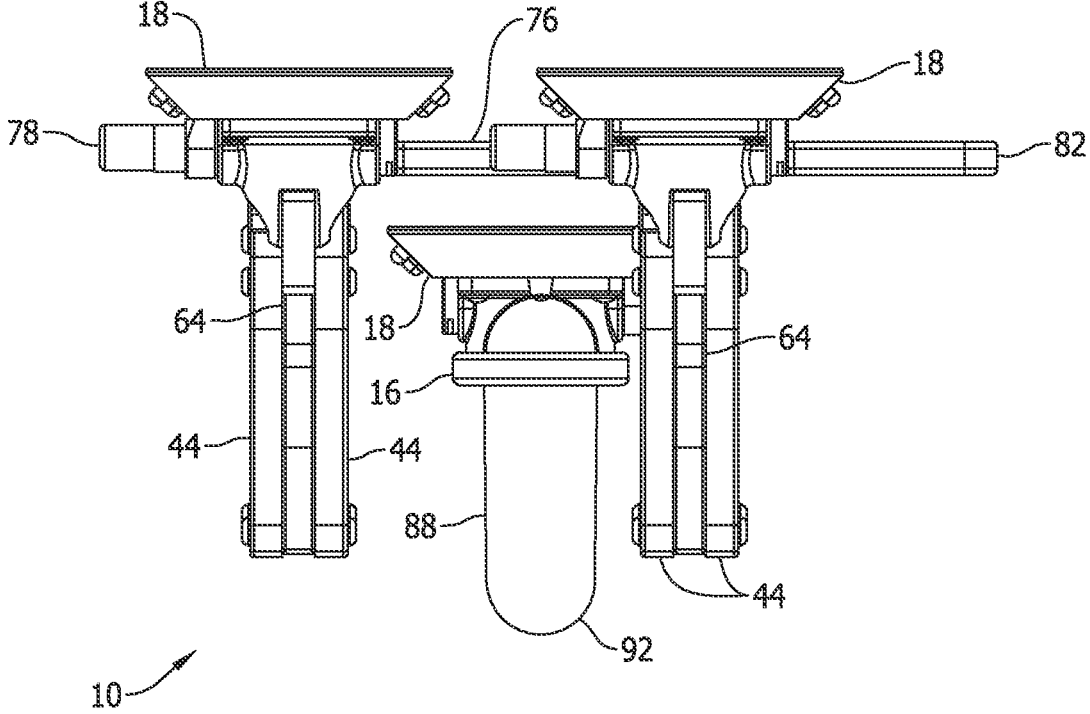
FIG. 4 is a representation of a top plan view of the transport rack assembly.

FIG. 1 is a representation of a perspective view of the transport rack assembly 10 of this disclosure. The transport rack assembly 10 is primarily constructed to facilitate or simplify the quick and easy removable attachment of the assembly 10 to the surface of a separate object, for example the surface of a rear window or rear hatchback of a vehicle. Additionally, the assembly 10 is primarily constructed to facilitate or simplify the quick and easy attachment of a separate object, for example a bicycle, to the assembly once the assembly is attached to the vehicle to enable transportation of the bicycle on the vehicle.

However, it should be understood that the transport rack assembly 10 is also constructed to be versatile, and the assembly can be quickly and easily attached to a surface of an object that is not a vehicle. Furthermore, the transport rack assembly 10 could be used to quickly and easily attach a separate object other than a bicycle to the transport rack assembly.

The component parts of the transport rack assembly 10 to be described are constructed of a material that provides the assembly with sufficient structural strength to function in the manner intended. The materials used in the construction of the transport rack assembly 10 could include metals, plastics, composites or other equivalent types of materials.

The transport rack assembly 10 is comprised of three separate basic components, a first component having a first clamp base 12 or a left side clamp base as viewed in FIGS. 1 and 2, a second component having a second clamp base 14 or a right side clamp base as viewed in FIGS. 1 and 2 and a third component having a third strap base 16 as viewed in FIGS. 1 and 2. Each of these components are constructed with attachment devices 18 that are configured to enable the components to be removably attached to a separate surface, for example a surface of a vehicle. The attachment devices 18 could be suction cup attachment devices that can removably attach the transport rack assembly 10 to a separate surface without requiring any alterations to the separate surface. Examples of attachment devices of this type are disclosed in the U.S. Pat. Nos. 9,821,721, and 10,267,453, both of which are incorporated herein by reference. Other equivalent types of attachment devices could be employed with the transport rack assembly 10.

The first clamp base 12 or left side clamp base and the second clamp base 14 or right side clamp base are substantially mirror images of each other and have the same constructions. Therefore, only the first clamp base 12 is described herein with it being understood that the second clamp base 14 has substantially the same construction.

As represented in FIGS. 1-3 the first clamp base 12 has a configuration of an upright oriented panel that supports a first clamp assembly. The clamp base 12 has an interior or proximal edge surface 22 and an opposite exterior or distal edge surface 24. The proximal edge surface 22 and distal edge surface 24 are planar surfaces. A pair of attachment devices 18 are secured to the proximal edge surface 22 of the clamp base 12. During use of the transport rack assembly 10 the proximal edge surface 22 is directed toward the separate surface on which the assembly 10 is attached. The distal edge surface 24 is directed away from the separate surface. For example, the proximal edge surface 22 will be directed toward a vehicle and the distal edge surface 24 will be directed away from a vehicle when the assembly 10 is employed on the vehicle.

The first clamp base 12 supports a first clamp assembly comprising a first clamp 32. The first clamp 32 projects from the clamp base 12. As represented in FIGS. 1 and 2, the first clamp 32 is comprised of two panels of like configurations that are in spaced positions side-by-side. The first clamp 32 is secured stationary on the clamp base 12. The first clamp 32 has a first clamping surface 34. The first clamping surface 34 could be provided by a resilient material that cushions engagement of the first clamp 32 with a separate object, as will be described, to prevent the engagement of the first clamp with the object from marring or causing any damage to the object. As represented in FIG. 3, the first clamp 32 has a length that extends in a horizontal orientation from a proximal end 36 of the first clamp secured stationary to the clamp base 12 to a distal end 38 of the first clamp.

The first clamp assembly also comprises a second clamp 44 projecting from the clamp base 12. The second clamp 44 is also formed by two panels of like configurations at spaced positions side by side. The second clamp 44 has a second clamping surface 46 that could also be a resilient material. The second clamp 44 has a length that extends in a horizontal orientation from a proximal end 48 of the second clamp connected to the clamp based 12 to a distal end 52 of the second clamp.

Figure 6:
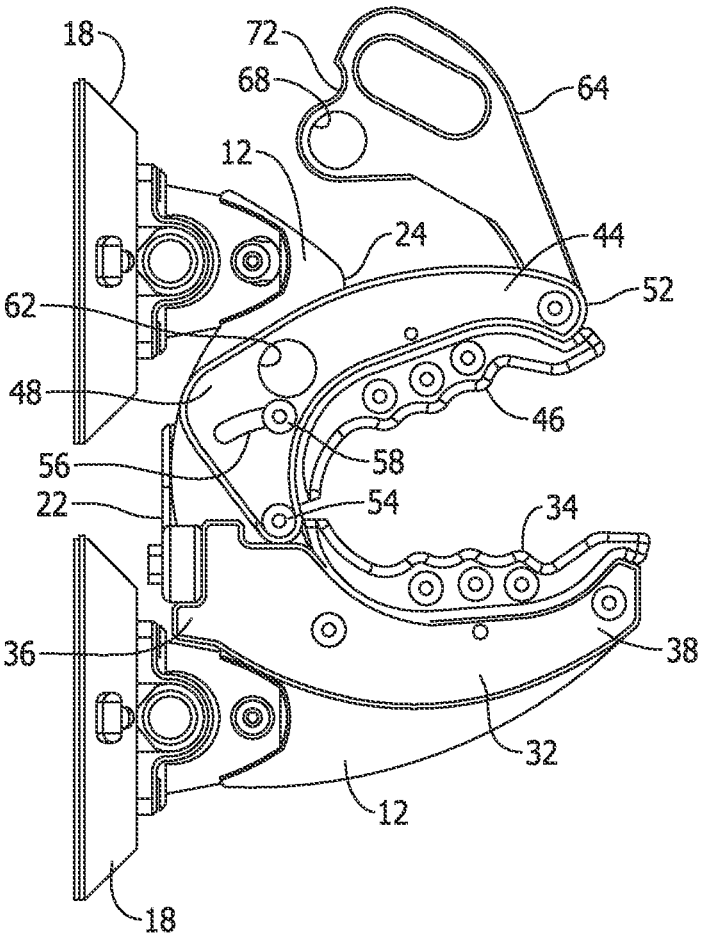
FIG. 6 is a representation of a left side elevation view of the clamp base of the transport rack assembly with the first clamp and the second clamp in open positions.
Figure 7:
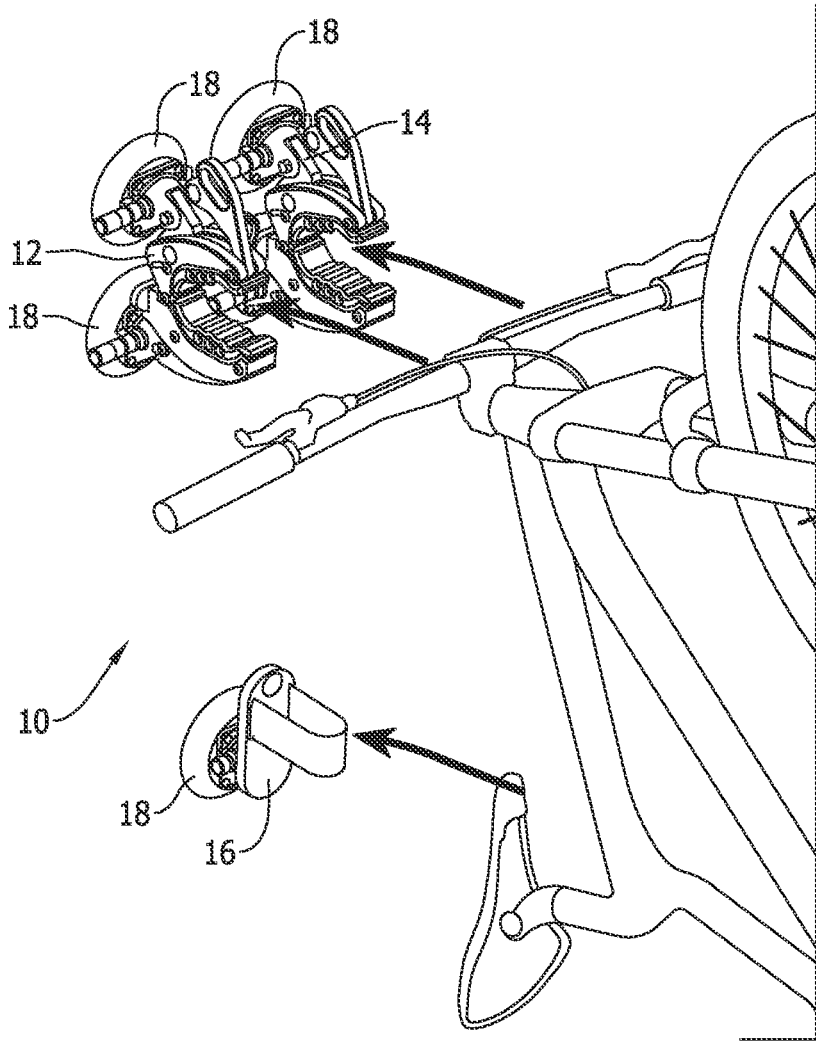
FIG. 7 is a partial representation of a perspective view of a bicycle being attached to the transport rack assembly.
Figure 8:
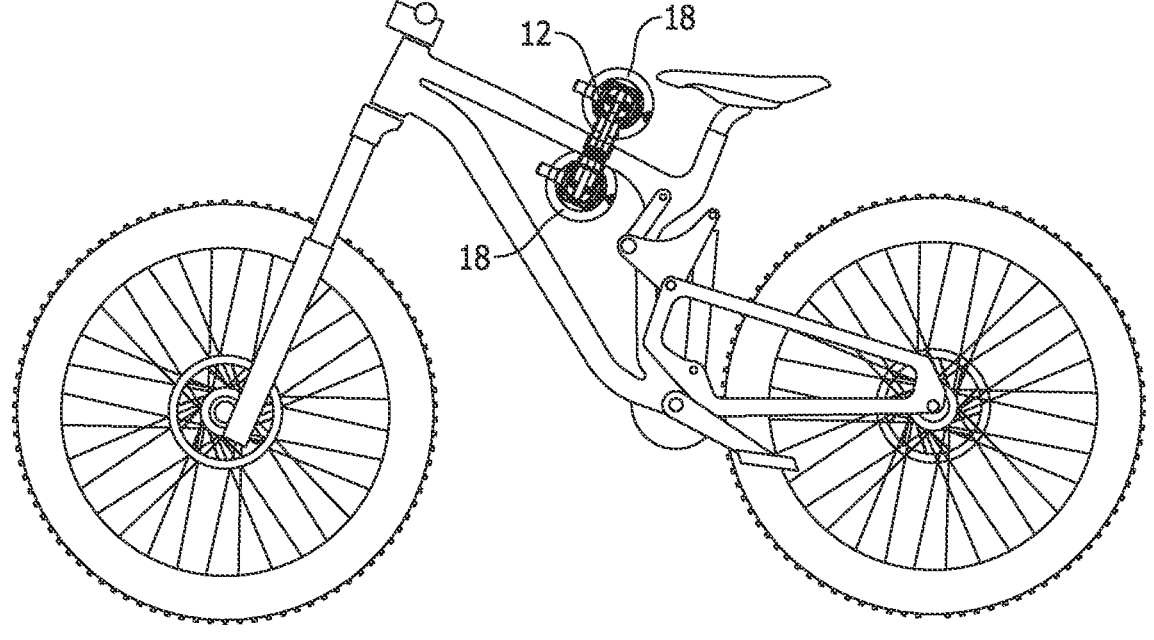
FIG. 8 is a representation of an elevation view of a bicycle attached to a single clamp base of the transport rack assembly.

A movable connection connects the proximal end 48 of the second clamp 44 to the clamp base 12. The movable connection is configured to enable the second clamp 44 to move on the clamp base 12 toward and away from the first clamp 32 between a clamping position where the first clamping surface 34 of the first clamp 32 engages with the second clamping surface 46 of the second clamp 44 as represented in FIG. 3, and an open position where the first clamping surface 34 of the first clamp is spaced from the second clamping surface 46 of the second clamp as represented in FIG. 6. The spacing enables a separate object, for example the handlebar of a bicycle as represented in FIG. 7 or the crossbar of a bicycle as represented in FIG. 8, to be positioned between the first clamping surface 34 and the second clamping surface 46.

The movable connection comprises a pivot pin 54 connecting the proximal end 48 of the second clamp 44 to the first clamp base 12 for pivoting movement of the second clamp about the pivot pin 54. The movable connection also comprises a slot 56 in a portion of the proximal end 48 of the second clamp 44 and a guide pin 58 secured to the first clamp base 12 and extending into the slot 56 in the second clamp 44. The guide pin 58 extends into and is movable through the slot 56 in response to the second clamp being moved in pivoting movements about the pivot pin 54. The pivot pin 54, the slot 56 and the guide pin 58 in the slot provide the movable connection that enables the second clamping surface 46 on the second clamp 44 to move toward and away from the first clamping surface 34 on the first clamp 32.

Figure 5:
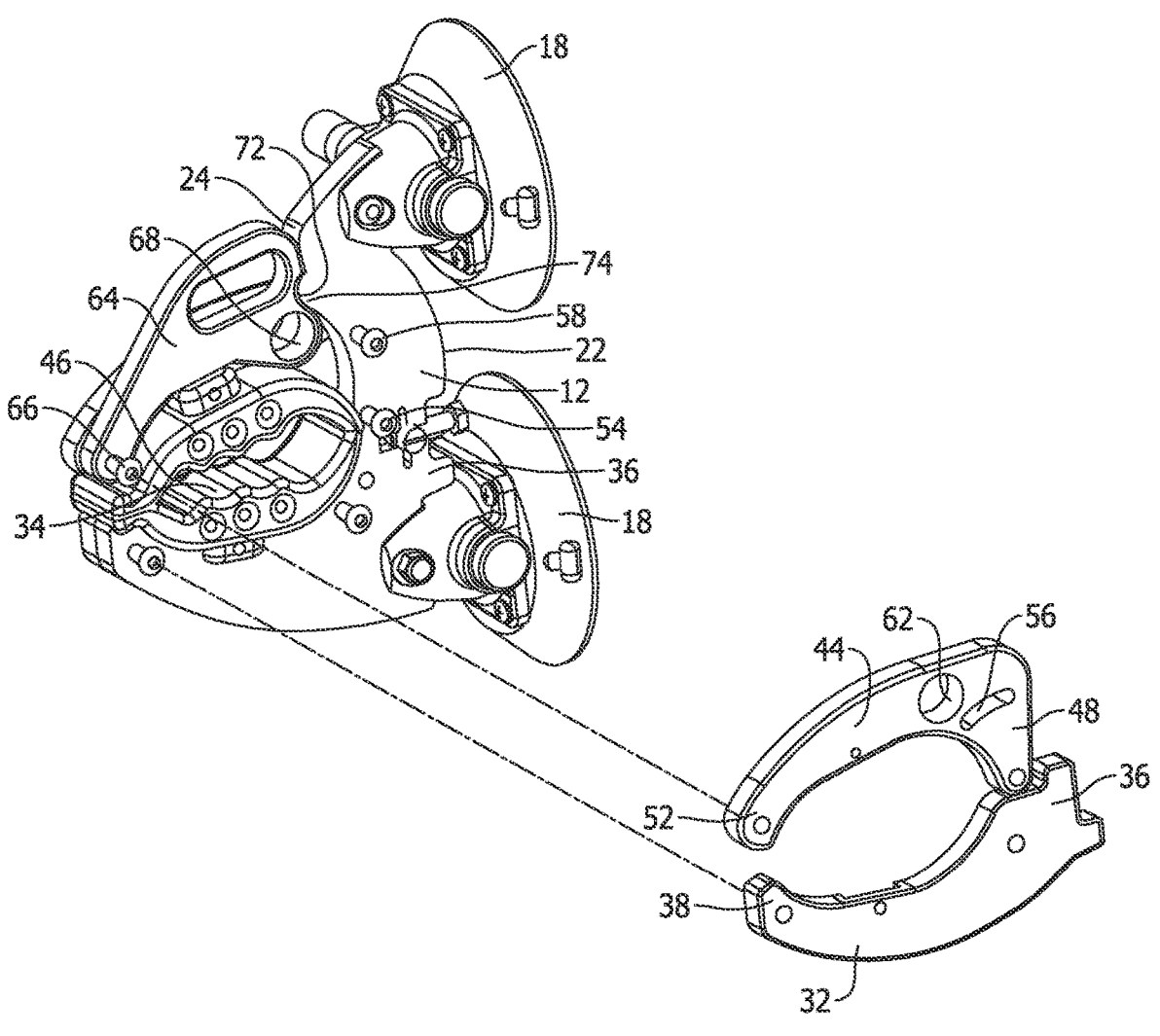
FIG. 5 is a representation of a perspective view of a part of the first clamp and a part of the second clamp removed from the clamp base of the transport rack assembly and showing the lever on the second clamp moved to the second, locked position against the distal edge of the clamp base.

There is a first opening 62 in the second clamp 44 positioned on the proximal end 48 of the second clamp. The first opening 62 is positioned on the second clamp 44 to align with the distal edge surface 24 of the clamp base 12 when the second clamp 44 is moved to the clamping position of the second clamp as represented in FIGS. 1, 3 and 5. The alignment of the first opening 62 and the distal edge surface 24 of the clamp base 12 enables an object, for example a shackle or cable of a lock to be inserted into the first opening 62 and adjacent the distal edge surface 24 of the clamp base 12 preventing movement of the second clamp 44 to the open position away from the first clamp 32 and securing together the first clamping surface 34 and the second clamping surface 46.

A lever 64 is mounted on the second clamp 44. As represented in FIGS. 3 and 6, the lever 64 is mounted by a pivot pin 66 on the distal end 52 of the second clamp 44. The pivot pin 66 enables the lever 64 to move in pivoting movements on the second clamp 44 between a locked or closed position of the lever 64 on the second clamp 44 represented in FIG. 3, and an unlocked or open position of the lever 64 on the second clamp 44 represented in FIG. 6. In the locked or closed position of the lever 64 on the second clamp 44 represented in FIG. 3 the lever 64 engages against the distal edge surface 24 of the clamp base 12 and prevents movement of the second clamp 44 from the closed, clamping position represented in FIGS. 1 and 3 to the open position represented in FIG. 6. In the unlocked or open position of the lever 64 on the second clamp 44 represented in FIG. 6 the lever 64 is disengaged from the distal edge surface 24 of the clamp base 12 and positioned remote from the clamp base 12 and the distal edge surface 24 and the second clamp 44 is free to move between the closed position of the second clamp 44 relative to the first clamp 32 represented in FIGS. 1 and 3 and the open position of the second clamp 44 relative to the first clamp 32 represented in FIG. 6.

There is a second opening 68 on the lever 64 adjacent the opposite end of the lever from the pivot pin 66. When the lever 64 is moved about the pivot pin 66 on the second clamp 44 to the first position of the lever on the second clamp the second opening 68 on the lever is spaced from the first opening 62 on the second clamp 44 as represented in FIG. 6. When the lever 64 is moved on the second clamp 44 to the second, locked position of the lever 64 on the second clamp 44 the second opening 68 on the lever 64 is in alignment with the first opening 62 on the second clamp 44 as represented in FIGS. 1 and 3. The alignment of the first opening 62 and the second opening 68 enables an object, for example a shackle or cable of a lock to be inserted into the first opening 62 and the second opening 68 preventing movement of the lever 64 out of engagement with the distal edge surface 24 of the clamp base 12 and preventing movement of the second clamp 44 to the open position away from the first clamp 32, thus securing together the first clamping surface 34 and the second clamping surface 46 in the clamping position.

FIG. 5 is a representation of a perspective view of one of the two parts of the second clamp 44 removed from the clamp base 12. FIG. 5 provides a view of the engagement of the lever 64 with the distal edge surface 24 of the clamp base 12 that prevents movement of the second clamp 44 away from the first clamp 32. Also represented in FIG. 5 is a notch 72 provided in the lever 64 that receives a projection 74 from the distal edge surface 24 of the clamp base 12. The engagement of the projection 74 in the notch 72 holds the lever 64 in engagement with the distal edge surface 24 of the clamp base 12 and requires a manual force to pull on the lever 64 and disengage the projection 74 from the notch 72 in order to then be able to move the lever 64 out of engagement with the distal edge surface 24 of the clamp base 12 and move the second clamp 44 to the open position.

As represented in FIGS. 1-4, an adjustable connection device 76 connects the first clamp base 12 and the second clamp base 14 in horizontally spaced relative positions. The connection device 76 is configured as a bar having an elongate length that extends between a first, left side end 78 of the bar and an opposite second, right side end 82 of the bar. The first end 78 of the bar is connected to the proximal edge surface 22 of the first clamp base 12. The first end 78 of the bar can be connected to the first clamp base 12 by a stationary connection, or by a pivoting connection that enables the bar to pivot relative to the first clamp base 12. An elongate slot 84 is formed through the length of the bar adjacent the second end 82 of the bar. An adjustable connection, for example a threaded nut and bolt connection with the bolt being fixed to the second clamp base 14 and extending through the slot 84 connects the second clamp base 14 to the bar 76. Loosening the adjustable connection between the bar 76 and the second clamp base 14 enables the second clamp base 14 to be adjustably positioned along the length of the slot 84 and the length of the bar 76. Subsequent tightening of the adjustable connection secures the second clamp base 14 to the bar 76 in the adjusted position. In this manner, the connection device 76 is adjustable, enabling the left side or first clamp base 12 and the right side or second clamp base 14 to be moved toward each other to a first spacing between the first clamp base 12 and the second clamp base 14 on the connection device 76, and enabling the first clamp base 12 and the second clamp base 14 to be moved away from each other to a second spacing between the first clamp base 12 and the second clamp base 14 on the connection device 76, where the second spacing is different from or larger than the first spacing. This enables the transport rack assembly 10 to be adjusted in size to accommodate the transport rack assembly to different sized surfaces on different vehicles to which the transport rack assembly can be removably attached.

As described earlier, the third strap base 16 is separate from and has a different construction from the first clamp base 12 and the second clamp base 14. A strap extends from the third strap base 16 and is configured to engage with a separate object, for example a bicycle seat as represented in FIG. 7 positioned adjacent the third strap base to secure the seat to the third strap base. The strap has a first portion 88 and a second portion 92 that are removably attachable together, for example by hook and loop fasteners. The first portion 88 and the second portion 92 of the strap are dimensioned and configured to extend around and engage with the separate object positioned adjacent the third strap base 16 to secure the object to the third strap base.

As various modifications could be made in the construction of the transport rack assembly and its method of operation herein described and illustrated without departing from the scope of this disclosure, it is intended that all matter contained in the foregoing description or shown in the accompanying drawings shall be interpreted as illustrative only rather than limiting. Thus, the breadth and scope of the present disclosure should not be limited by any of the above described examples but should be defined only in accordance with the following claims appended hereto and their equivalence.

The invention claimed is:

1. A transport rack assembly comprising:

a clamp base;

a first clamp on the clamp base;

a second clamp on the clamp base, the second clamp being movable on the clamp base between a first position of the second clamp where the second clamp is spaced from the first clamp enabling an object to be positioned between the first clamp and the second clamp, and a second position of the second clamp where the second clamp engages against the first clamp enabling the object positioned between the first clamp and the second clamp to be clamped between the first clamp and the second clamp;

a lever on the second clamp, the lever being movable on the second clamp between a locked position and an unlocked position of the lever on the second clamp; and in the locked position of the lever on the second clamp the lever engages against the clamp base and prevents movement of the second clamp on the clamp base between the first position of the second clamp and the second position of the second clamp and in the unlocked position of the lever on the second clamp the lever disengages from the clamp base and enables movement of the second clamp on the clamp base between the first position of the second clamp and the second position of the second clamp.

2. The transport rack assembly of claim 1, further comprising:

a strap base, the strap base being separate from the clamp base;

a strap extending from the strap base, the strap being configured to engage with an object positioned adjacent to the strap base and secure the object to the strap base.

3. The transport rack assembly of claim 2, further comprising:

the strap having a first portion and a second portion, the first portion and the second portion of the strap being removably attachable together.

4. The transport rack assembly of claim 2, further comprising:

the clamp base is removably attachable to a separate surface; and the strap base is removably attachable to a separate surface.

5. The transport rack assembly of claim 2, further comprising:

an attachment device on the clamp base, the attachment device being operable to removably attach the clamp base to a separate surface; and an attachment device on the strap base, the attachment device on the strap base being operable to removably attach the strap base to a separate surface.

6. The transport rack assembly of claim 1, further comprising:

a first opening on the second clamp; and a second opening on the lever, the lever being movable on the second clamp between the locked position where the second opening is aligned with the first opening and the unlocked position where the second opening is displaced from the first opening.

7. The transport rack assembly of claim 1, further comprising:

the first clamp is secured stationary on the clamp base and projects from the clamp base; and the second clamp is secured by a movable connection on the clamp base and projects from the clamp base, the movable connection is configured to enable the second clamp to be movable on the clamp base.

8. The transport rack assembly of claim 7, further comprising:

the movable connection comprising a slot in the second clamp; and the movable connection comprising a guide pin on the clamp base and extending into the slot, the guide pin being movable in the slot and thereby connecting the second clamp to the clamp base, the movable connection being operable to enable the second clamp to move between the first position and the second position of the second clamp.

9. The transport rack assembly of claim 1, further comprising:

the clamp base being a first clamp base;

a second clamp base separate from the first clamp base;

a first clamp on the second clamp base;

a second clamp on the second clamp base, the second clamp on the second clamp base being movable between a first position of the second clamp on the second clamp base where the second clamp is spaced from the first clamp on the second clamp base enabling an object to be positioned between the first clamp and the second clamp on the second clamp base, and a second position of the second clamp on the second clamp base where the second clamp engages with the first clamp on the second clamp base enabling the object positioned between the first clamp and the second clamp on the second clamp base to be clamped between the first clamp and the second clamp on the second clamp base;

a lever on the second clamp on the second clamp base, the lever being movable on the second clamp between a locked position and an unlocked position of the lever on the second clamp on the second clamp base; and in the locked position of the lever on the second clamp on the second clamp base the lever engages against the second clamp base and prevents movement of the second clamp on the second clamp base between the first position of the second clamp and the second position of the second clamp on the second clamp base and in the unlocked position of the lever on the second clamp on the second clamp base the lever disengages from the second clamp base and enables movement of the second clamp on the second clamp base between the first position of the second clamp on the second clamp base and the second position of the second clamp on the second clamp base.

10. The transport rack assembly of claim 9, further comprising:

a connection device connecting the first clamp base and the second clamp base on the connection device, the connection device being configured to be adjustable enabling the first clamp base and the second clamp base to be moved to a first spacing between the first clamp base and the second clamp base on the connection device, and enabling the first clamp base and the second clamp base to be moved to a second spacing between the first clamp base and the second clamp base on the connection device where the second spacing is different from the first spacing.

11. A transport rack assembly comprising:

a clamp base, the clamp base having a proximal edge surface and a distal edge surface on an opposite side of the clamp base from the proximal edge surface;

an attachment device on the proximal edge surface, the attachment device being configured to removably attach the clamp base to a separate surface with the proximal edge surface of the clamp base opposing the separate surface;

a first clamp secured to the clamp base and projecting from the clamp base, the first clamp having a first clamping surface, the first clamp having a length that extends from a proximal end of the first clamp secured stationary to the clamp base to a distal end of the first clamp;

a second clamp connected to the clamp base and projecting from the clamp base, the second clamp having a second clamping surface, the second clamp having a length that extends from a proximal end of the second clamp connected to the clamp base to a distal end of the second clamp;

a movable connection connecting the proximal end of the second clamp to the clamp base, the movable connection being configured to enable the second clamp to move on the clamp base toward and away from the first clamp between a clamping position where the first clamping surface of the first clamp engages with the second clamping surface of the second clamp and an open position where the first clamping surface of the first clamp is spaced from the second clamping surface of the second clamp;

a lever on the second clamp, the lever being movable on the second clamp between a locked position and an unlocked position of the lever on the second clamp; and in the locked position of the lever on the second clamp the lever engages against the distal edge surface of the clamp base and prevents movement of the second clamp on the clamp base between the clamping position and the open position and in the unlocked position of the lever on the second clamp the lever disengages from the distal edge surface of the clamp base and enables movement of the second clamp on the clamp base between the open position of the second clamp and the clamping position of the second clamp.

12. The transport rack assembly of claim 11, further comprising:

a strap base, the strap base being separate from the clamp base;

an attachment device on the strap base, the attachment device being configured to removably attach the strap base to a separate surface; and a first portion of a strap and a second portion of a strap on the strap base, the first portion of the strap and the second portion of the strap being configured to engage with an object positioned adjacent the strap base and secure the object to the strap base.

13. The transport rack assembly of claim 11, further comprising:

a first opening on the second clamp; and a second opening on the lever, the lever being movable on the second clamp between the locked position where the second opening is aligned with the first opening and the unlocked position where the second opening is displaced from the first opening.

14. The transport rack assembly of claim 11, further comprising:

the movable connection comprising a pivot pin connecting the second clamp to the clamp base;

the movable connection comprising a slot in the second clamp; and the movable connection comprising a guide pin on the clamp base, the guide pin extending into the slot, the guide pin being movable in the slot and thereby the pivot pin, the slot and the guide pin connect the second clamp to the clamp base, the movable connection being operable to enable the second clamp to move between the clamping position and the open position of the second clamp.

15. The transport rack assembly of claim 11, further comprising:

a notch formed in the lever; and a projection on the distal edge surface of the clamp base, the projection engaging in the notch on the lever when the lever is in the locked position.

16. The transport rack assembly of claim 11, further comprising:

the clamp base being a first clamp base;

a second clamp base separate from the first clamp base;

a first clamp secured to the second clamp base;

a second clamp connected to the second clamp base, the second clamp on the second clamp base being movable on the second clamp base between an open position of the second clamp on the second clamp base where the second clamp is spaced from the first clamp on the second clamp base enabling an object to be positioned between the first clamp and the second clamp on the second clamp base, and a clamping position of the second clamp on the second clamp base where the second clamp engages with the first clamp on the second clamp base enabling the object position between the first clamp and the second clamp on the second clamp base to be clamped between the first clamp and the second clamp on the second clamp base;

a lever on the second clamp on the second clamp base, the lever being movable on the second clamp between a locked position and an unlocked position of the lever on the second clamp on the second clamp base; and in the locked position of the lever on the second clamp on the second clamp base the lever engages against the second clamp base and prevents movement of the second clamp on the second clamp base between the open position of the second clamp and the clamping position of the second clamp on the second clamp base and in the unlocked position of the lever on the second clamp on the second clamp base the lever disengages from the second clamp base and enables movement of the second clamp on the second clamp base between the open position of the second clamp on the second clamp base and the clamping position of the second clamp on the second clamp base.

17. The transport rack assembly of claim 16, further comprising:

a connection device connecting the first clamp base and the second clamp base, the connection device being configured to be adjustable enabling the first clamp base and the second clamp base to be moved to a first spacing between the first clap base and the second clamp base on the connection device, and enabling the first clamp base and the second clamp base to be moved to a second spacing between the first clamp base and the second clamp base on the connection device where the second spacing is different from the first spacing.

18. A transport rack assembly comprising:

a first clamp base;

a second clamp base separate from the first clamp base;

a first clamp on the first clamp base;

a second clamp on the first clamp base, the second clamp being configured to be movable on the first clamp base between a first position of the second clamp where the second clamp is spaced from the first clamp enabling an object to be positioned between the first clamp and the second clamp, and a second position of the second clamp where the second clamp engages against the first clamp enabling the object positioned between the first clamp and the second clamp to be clamped between the first clamp and the second clamp;

a first clamp on the second clamp base;

a second clamp on the second clamp base, the second clamp on the second clamp base being configured to be movable on the second clamp base between a first position of the second clamp where the second clamp is spaced from the first clamp on the second clamp base enabling an object to be positioned between the first clamp and the second clamp on the second clamp base, and a second position of the second clamp on the second clamp base where the second clamp engages against the first clamp on the second clamp base enabling the object positioned between the first clamp and the second clamp to be clamped between the first clamp and the second clamp on the second clamp base; and a connection device connecting the first clamp base and the second clamp base, the connection device being configured to be adjustable enabling the first clamp base and the second clamp base to be moved to a first spacing between the first clamp base and the second clamp base on the connection device and enabling the first clamp base and the second clamp base to be moved to a second spacing between the first clamp base and the second clamp base on the connection device where the second spacing is different from the first spacing.

19. The transport rack assembly of claim 18, further comprising:

a strap base, the strap base being separate from the first clamp base and the second clamp base; and a strap extending from the strap base, the strap being configured to engage with an object position adjacent the strap base and secure the object to the strap base.

20. The transport rack assembly of claim 18, further comprising:

a lever on the second clamp on the first clamp base, the lever being movable on the second clamp to a position where the lever engages against the first clamp base and holds the second clamp in the second position of the second clamp; and a lever on the second clamp on the second clamp base, the lever being movable on the second clamp on the second clamp base to a position where the lever engages against the second clamp base and holds the second clamp in the second position of the second clamp on the second clamp base.

* * * * *